(12) United States Patent
Aoshima

(10) Patent No.: US 6,642,687 B2
(45) Date of Patent: Nov. 4, 2003

(54) STEPPING-MOTOR DRIVING DEVICE AND LENS DRIVING DEVICE USING THE SAME

(75) Inventor: Chikara Aoshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 74 days.

(21) Appl. No.: 09/944,068

(22) Filed: Sep. 4, 2001

(65) Prior Publication Data
US 2002/0047336 A1 Apr. 25, 2002

(30) Foreign Application Priority Data
Sep. 7, 2000 (JP) ........................................ 2000-270947

(51) Int. Cl.[7] ............................. H02P 8/12; H02K 37/10
(52) U.S. Cl. ..................................................... 318/696
(58) Field of Search ................................ 318/685, 696, 318/254, 701, 702; 388/904

(56) References Cited

U.S. PATENT DOCUMENTS

| 3,777,246 A | 12/1973 | Barnes ........................ 318/696 |
| 3,824,440 A | 7/1974 | McIntosh ..................... 318/696 |
| 4,140,955 A | 2/1979 | Drabing ....................... 318/696 |
| 4,443,746 A | * 4/1984 | Araki .......................... 318/696 |
| 4,455,520 A | 6/1984 | Ward et al. ................. 318/696 |
| 4,518,907 A | 5/1985 | Giguere ....................... 318/696 |
| 4,641,073 A | * 2/1987 | Sawada ....................... 318/696 |
| 4,751,445 A | 6/1988 | Sakai .......................... 318/696 |
| 4,855,660 A | * 8/1989 | Wright et al. ............... 318/696 |
| 4,929,879 A | 5/1990 | Wright et al. ............... 318/696 |
| 5,084,661 A | * 1/1992 | Tanaka ........................ 318/685 |
| 5,198,909 A | * 3/1993 | Ogiwara et al. ............ 358/412 |
| 5,245,372 A | 9/1993 | Aoshima ..................... 354/106 |
| 5,283,604 A | 2/1994 | Aoshima ..................... 354/21 |
| 5,353,078 A | 10/1994 | Aoshima ..................... 354/105 |
| 5,384,506 A | 1/1995 | Aoshima .................. 310/49 R |
| 6,172,440 B1 | 1/1995 | Aoshima .................. 310/49 R |
| 5,481,323 A | 1/1996 | Egawa et al. ............... 354/106 |
| 5,563,673 A | 10/1996 | Aoshima ..................... 396/516 |
| 5,572,105 A | 11/1996 | Nojima et al. ................ 318/69 |
| 5,729,780 A | 3/1998 | Aoshima ..................... 396/320 |
| 5,742,858 A | 4/1998 | Aoshima ..................... 396/320 |
| 5,831,356 A | 11/1998 | Aoshima .................. 310/49 R |
| 5,899,591 A | 5/1999 | Aoshima ..................... 396/413 |
| 5,925,945 A | 7/1999 | Aoshima .................. 310/49 R |
| 5,942,872 A | 8/1999 | Steger et al. ................ 318/696 |
| 5,945,753 A | 8/1999 | Maegawa et al. .......... 310/68 B |
| 5,969,453 A | 10/1999 | Aoshima ..................... 310/156 |

(List continued on next page.)

FOREIGN PATENT DOCUMENTS

| JP | 60-140934 | 9/1985 |
| JP | 6-64281 | 3/1994 |
| JP | 6-250070 | 9/1994 |
| JP | 9-023695 | 1/1997 |
| JP | 9-047088 | 2/1997 |
| JP | 9-331555 | 12/1997 |
| JP | 9-331666 | 12/1997 |

Primary Examiner—Bentsu Ro
(74) Attorney, Agent, or Firm—Fitzpatrick, Cella, Harper & Scinto

(57) ABSTRACT

A driving device for a stepping motor capable of providing positioning accuracy with low power consumption includes elements such as a setting circuit for setting the number of driving steps of the stepping motor, a storage circuit for storing a first driving table containing energizing amount data for each step at which the stepping motor is energized and driven in a micro-step manner, and a second driving table containing energizing amount data different in value from the first driving table, and a driving circuit for energizing the stepping motor during the driving steps set in number by said setting circuit according to the energizing amount data of the first or second driving table, and the and the driving circuit selects either the first or second driving table according to the number of remaining steps to be driven.

27 Claims, 11 Drawing Sheets

U.S. PATENT DOCUMENTS

| | | | |
|---|---|---|---|
| 5,973,425 A | 10/1999 | Aoshima | 310/49 R |
| 5,982,134 A | 11/1999 | Tanaka | 318/696 |
| 6,016,044 A * | 1/2000 | Holdaway | 318/696 |
| 6,046,517 A | 4/2000 | Sasaki et al. | 310/40 MM |
| 6,049,677 A | 4/2000 | Ueda et al. | 396/319 |
| 6,081,053 A | 6/2000 | Maegawa et al. | 310/49 R |
| 6,118,963 A | 9/2000 | Fujikura et al. | 318/696 |
| 6,157,107 A | 12/2000 | Aoshima et al. | 310/56 |
| 6,208,107 B1 | 3/2001 | Maske et al. | 318/685 |

* cited by examiner

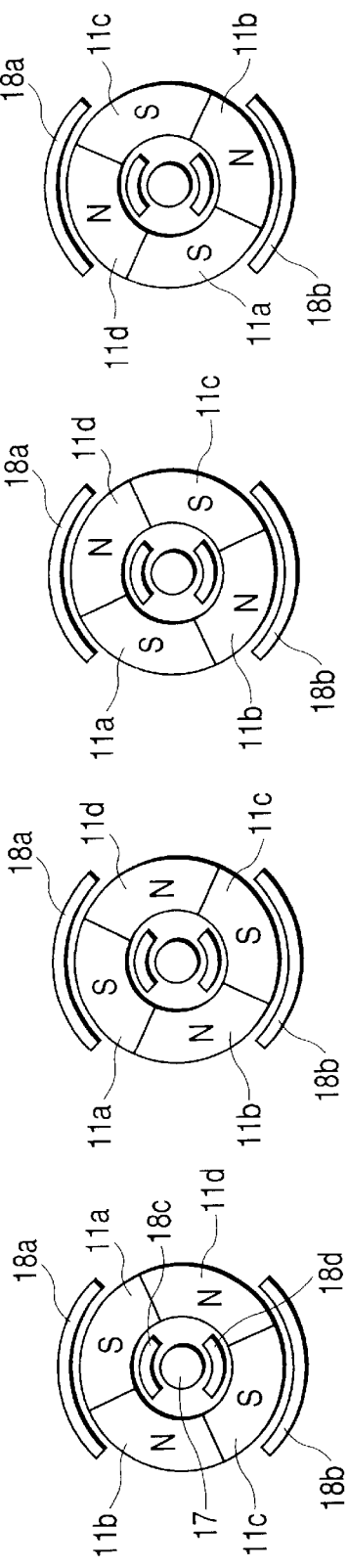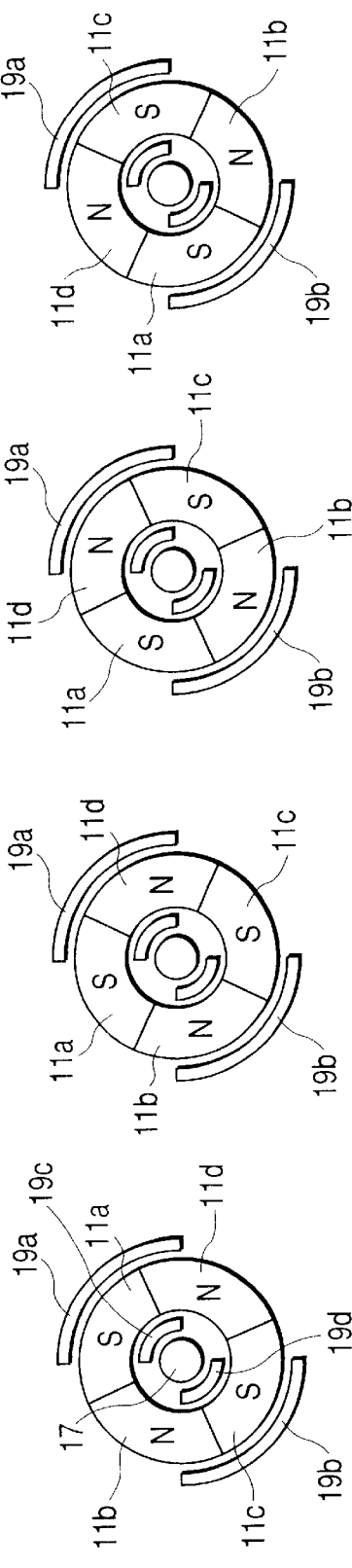

STEPPING-MOTOR DRIVING DEVICE AND LENS DRIVING DEVICE USING THE SAME

BACKGROUND OF THE INVENTION

1. Field of the Invention

The present invention relates to a driving device for driving a two-phase PM type stepping motor, and a lens driving device provided with the stepping motor driven by the driving device.

2. Related Background Art

A lens barrel device for moving a lens of a camera along an optical axis using a stepping motor driven with pulse signals is proposed, for example, in U.S. Pat. No. 5,384,506. In this lens barrel, the stepping-motor driving frequency and the number of driving pulses (number of steps) can be so controlled that the position of the lens with respect to the optical axis will be accurately adjusted compared to that using a DC motor or the like.

Though the above-mentioned patent teaches such a case that the lens is moved along the optical axis, the lens might be moved along a direction vertical to the optical axis in other devices such as a pickup device for reading out information recorded on an information recording disk such as a CD or DVD.

As another technique for precise control or adjustment of a position, there is a micro-step driving system in which current to energize coils is varied in stepwise fashion to stop a rotor of a motor in position according to the varied energizing current. FIG. 13 illustrates a method of energization in the micro-step driving system.

The micro-step driving system produces lower motor's rotational speed and torque than a full-step driving system. This means that the micro-step driving system necessarily involves higher motor's rotation resolution than the full-step driving system. Taking both advantages, an object can be placed in position using both driving systems. In other word, the full-step driving system is used for high-speed driving of the object when the object is far from a target location, and the micro-step driving system is used for precise positioning of the object when the object comes in close proximity to the target location. Thus high-speed, precise positioning can be achieved. The micro-step driving system is also used to gradually speed up the object during a low speed period for smooth startup, and the full-step driving system is used for high-speed driving of the object when the driving speed reaches a predetermined speed. This makes possible smooth, high-speed positioning of the driven object.

Upon stopping the rotor by micro-step control, however, the driving force of the motor's rotation for positioning the object at the desired target location is reduced as the object is approaching the desired target location. In this case, even a little frictional force might make it difficult to place the object in the desired target location.

In contrast, if the rotor is stopped by full-step control, the driving force of the motor's rotation becomes larger than the frictional force, which makes it easy to position the object. The reason why the full-step control makes it easy to position the object will be described below. To drive the rotor to the next rotational position, a driving circuit sends the motor a signal according to the next rotational position. The rotor, however, starts rotating with a slight delay after the driving circuit sends the signal. Thus a difference between the target rotational position and the actual rotor position occurs. If the difference is within a certain range, the driving force of the rotor's rotation increases. Since the full-step driving can produce a larger amount of one-step rotation than that of the micro-step driving, the difference can also increase, which in turn makes the driving force larger. On the other hand, the micro-step driving produces a smaller amount of one-step rotation, and therefore, the difference cannot increase, which makes the driving force smaller than that of the full-step driving.

The motor's driving force has only to increase in order to make positioning of an object easy. An increase in the motor's driving force, however, needs an increase in current passed through coils, which may make electric power consumption high, or runs the danger of overheating the motor and hence lowering the motor's characteristics. From this standpoint, it still has room for an improved configuration, which can achieve precise positioning of the rotor without passing excess current through the coils in vain.

On the other hand, U.S. Pat. No. 5,831,356 discloses a method of energization for switching from the micro-step driving mode to the full-step driving mode, and vice versa. FIG. 14 illustrates the energization method. Description will be made below by taking as an example switching from the full-step driving mode to the micro-step driving mode by varying energization of the coils in the motor. FIG. 15 illustrates the motor for use in switching from the full-step driving mode to the micro-step driving mode by the energization method shown in FIG. 14. FIGS. 16A and 17A are sectional views taken by A—A line in FIG. 15. FIGS. 16B and 17B are sectional views taken by B—B line in FIG. 15. The rotational position of the rotor at T1 in FIG. 14 is shown in FIGS. 16A and 16B, and that at T2 in FIG. 14 is shown in FIGS. 17A and 17B. It is apparent from FIGS. 16A, 16B, 17A and 17B that the rotational positions of the rotor between T1 and T2 are displaced Θ degree with respect to each other. In other words, switching from the full-step driving mode to the micro-step driving mode causes a displacement in the rotor's rotational position. Thus the energization method still leaves some to be desired to prevent a displacement in the rotor's rotational position at the time of switching between driving modes.

Further, when the rotor of the motor is stopped and retained in the micro-step driving mode, the accuracy of stopping the rotor is susceptible to backlash of gear members such as gears and screws for transmitting rotations to the driven object, or inertial friction produced on a sliding portion. Therefore, it also has room for an improved configuration, which produces little or no ill effects mentioned above.

SUMMARY OF THE INVENTION

According to one aspect of the present invention, two different micro-step driving tables, each of which contains data on energizing amount for each step, are stored in a storage circuit. In case of driving the motor up to a number of steps set by an instruction circuit, a driving circuit energizes the motor on the basis of the data of the first micro-step driving table, and at a predetermined number of final steps, it energizes the motor on the basis of the data of the second micro-step driving table the data of which are set larger than those of the first micro-step driving table. In this configuration, even such a micro-step driving mode that it produces a small driving force just before the rotor is stopped can increase the driving force just before the rotor is stopped, which can achieve high-precision positioning against the frictional force.

BRIEF DESCRIPTION OF THE DRAWINGS

FIGS. 4A, 4B, 4C and 4D are sectional views taken by A—A line in FIG. 3, and

FIGS. 4E, 4F, 4G and 4H are sectional views taken by B—B line in FIG. 3.

DESCRIPTION OF THE PREFERRED EMBODIMENTS

Figure 1:
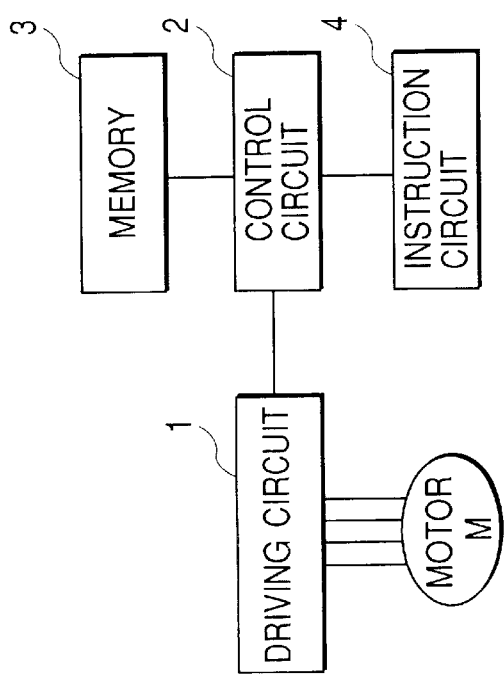
FIG. 1 is a block diagram of electric circuitry in a driving device according to one preferred embodiment of the present invention.
Figure 2:
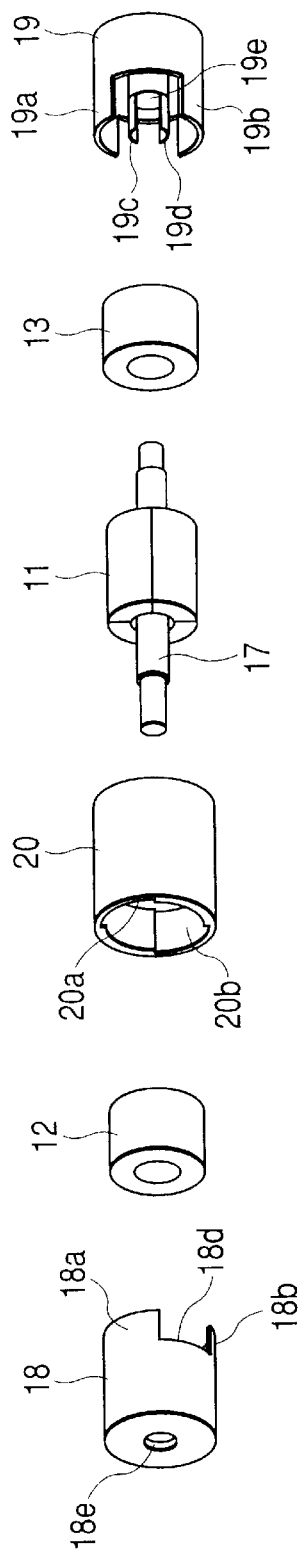
FIG. 2 is an exploded perspective view of a stepping motor used in the embodiment.
Figure 3:
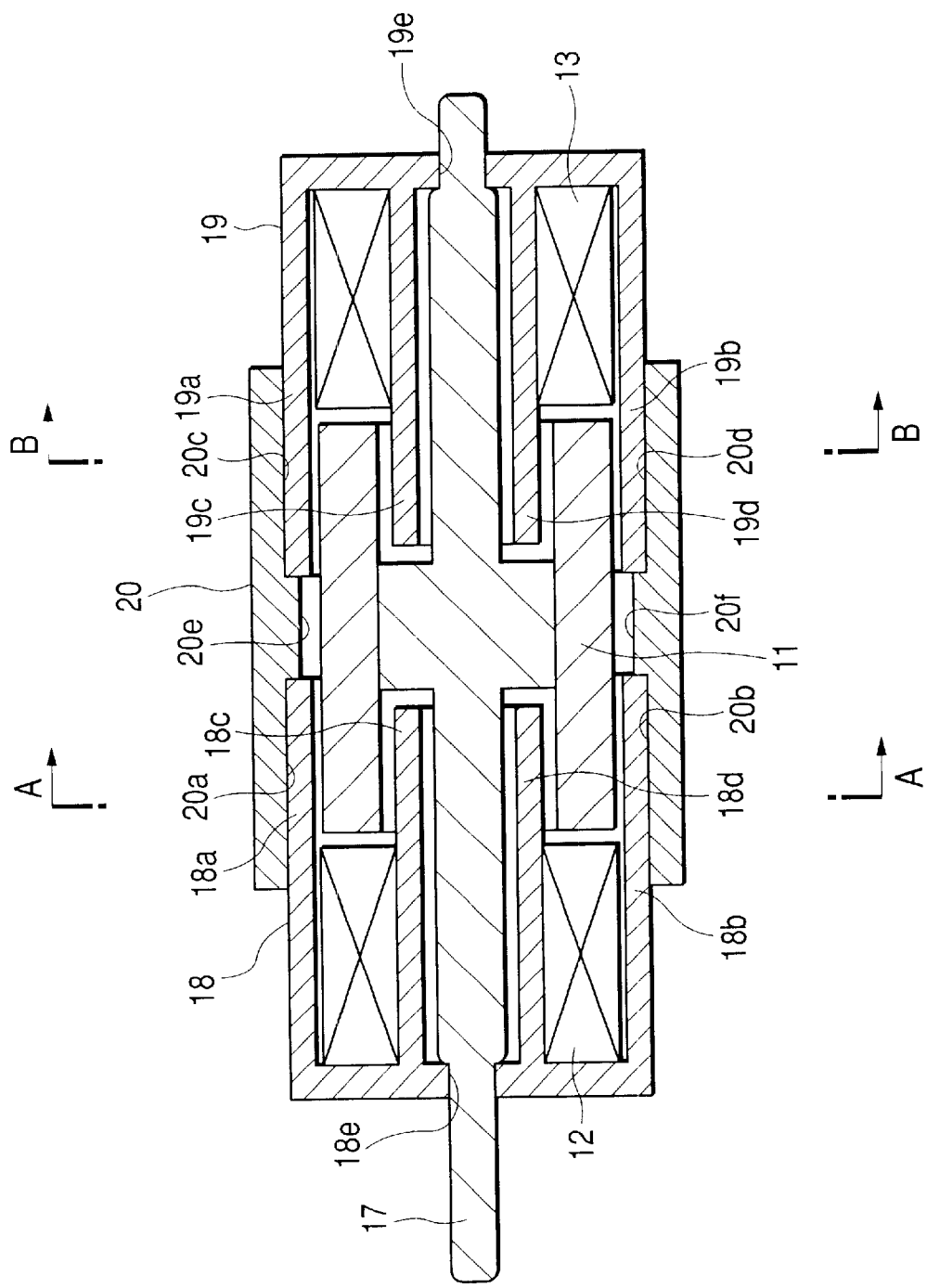
FIG. 3 is a sectional view in an axial direction of the stepping motor of FIG. 2 after assembled.
Figure 5A:
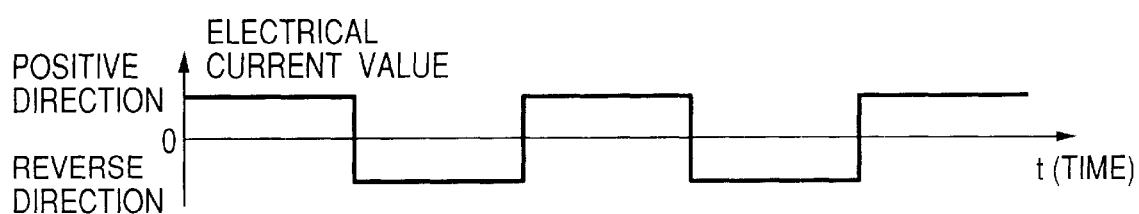
FIGS. 5A and 5B are graphs illustrating a relationship between energizing current to coils and elapsed time at the time of full-step driving.
Figure 5B:
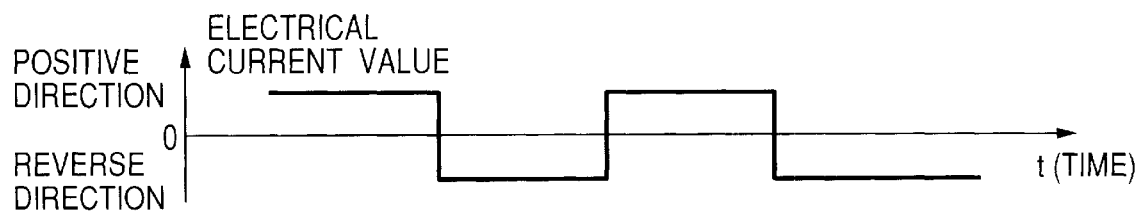
Figure 6:
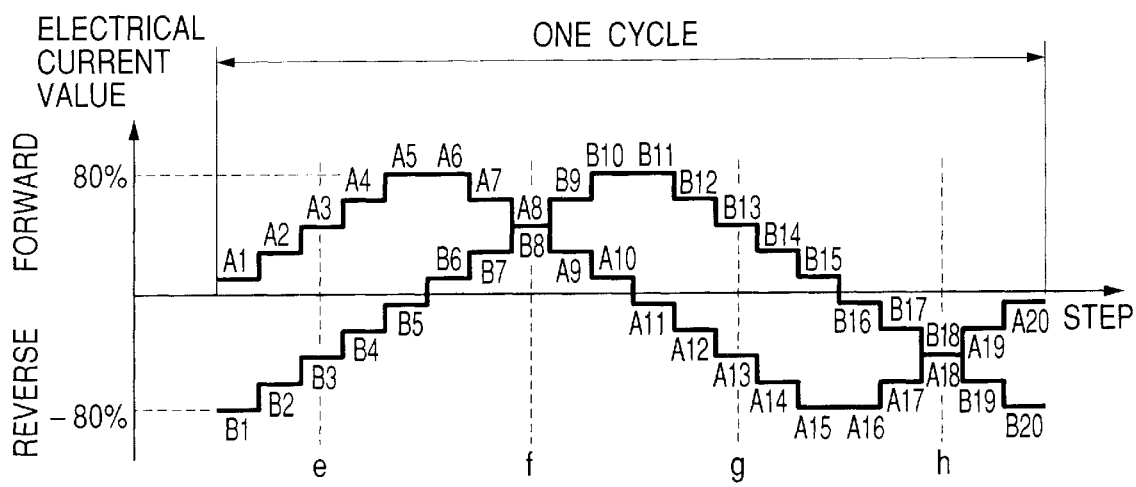
FIG. 6 is a graph illustrating energizing current to the coils at each step of the first micro-step driving table.
Figure 7:
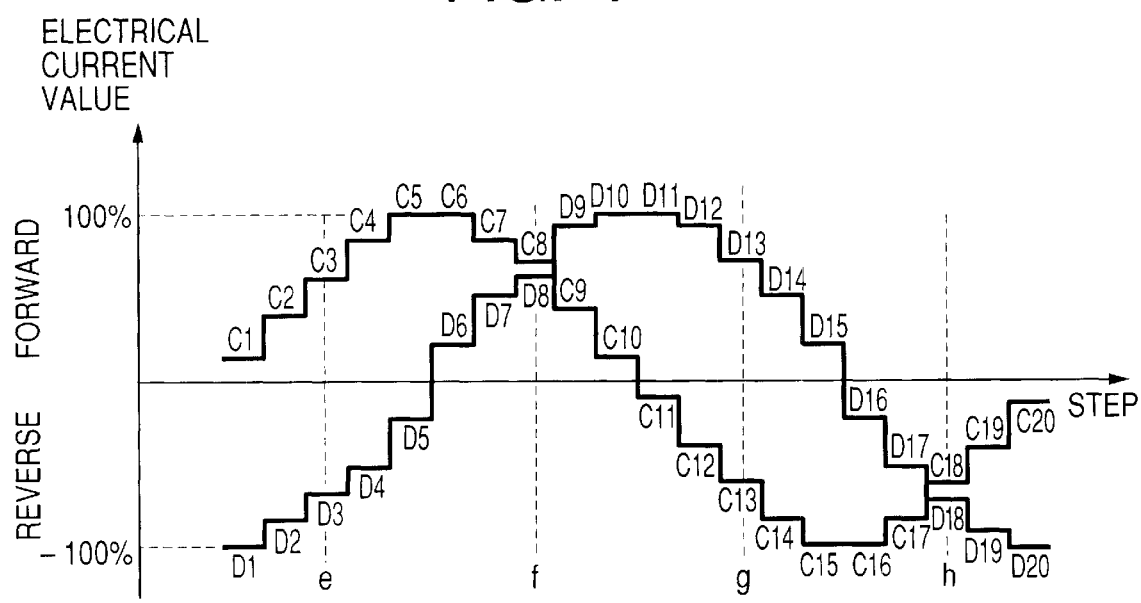
FIG. 7 is a graph illustrating energizing current to the coils at each step of the second micro-step driving table.
Figure 8:
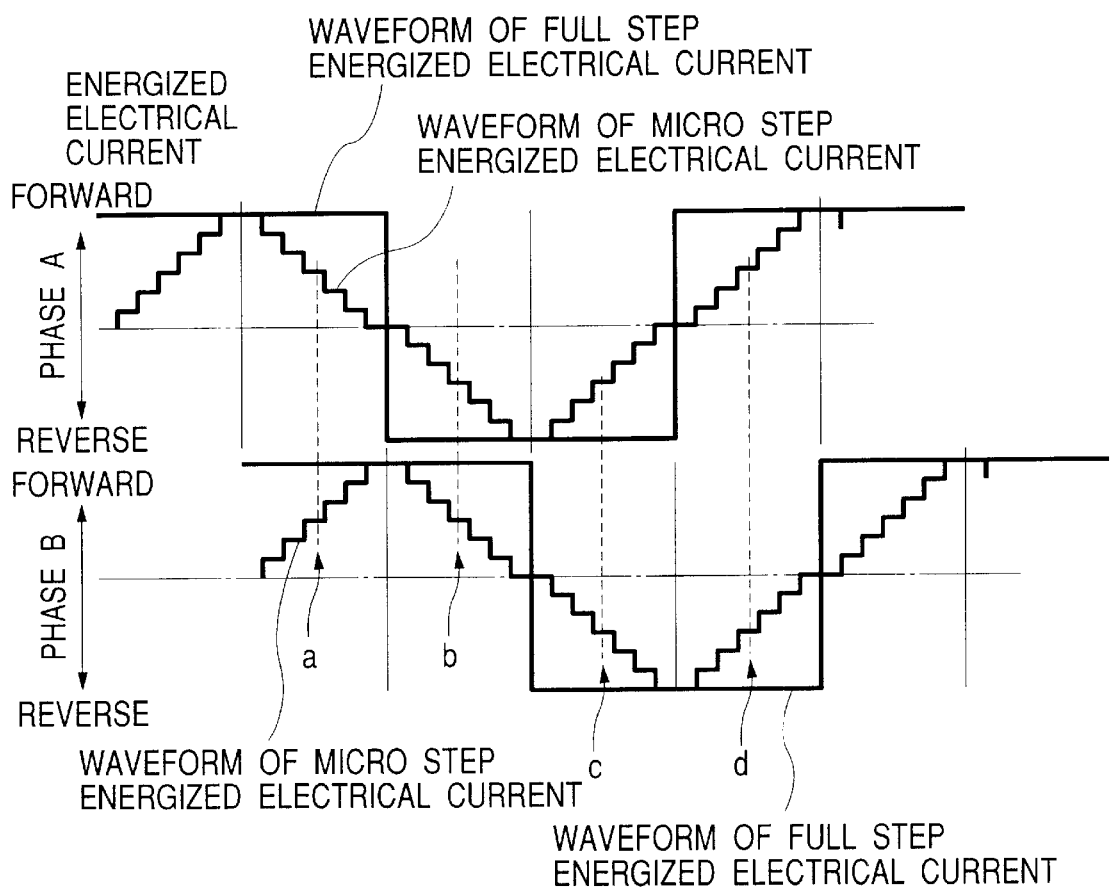
FIG. 8 is a graph illustrating states of energizing current in both the micro-step driving mode and the full-step driving mode.
Figure 9:
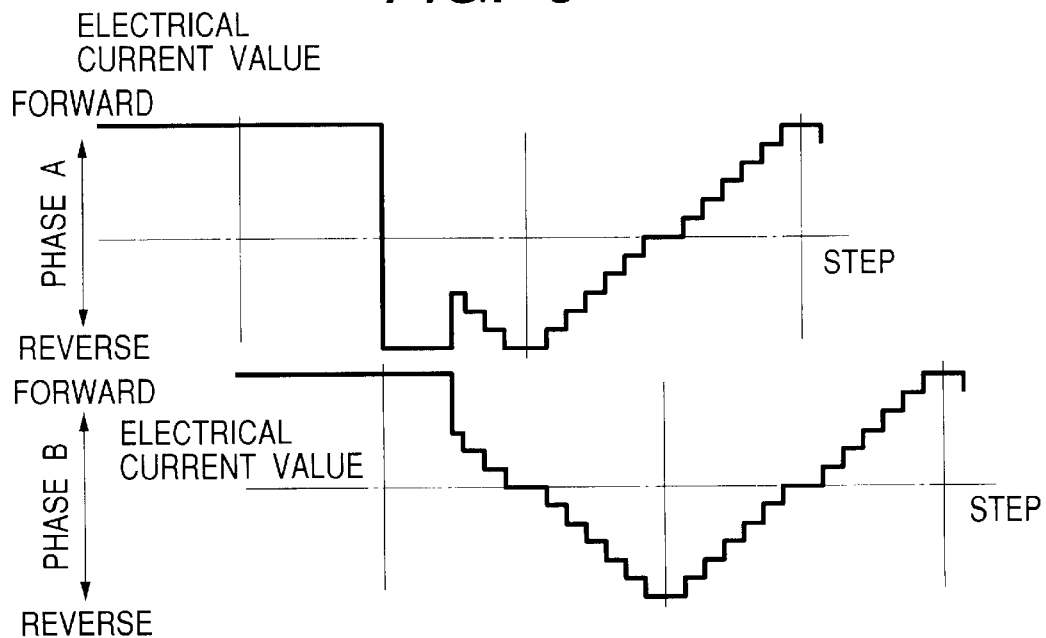
FIG. 9 is a graph illustrating states of energizing current at the time of switching from the full-step driving mode to the micro-step driving mode.
Figure 10:
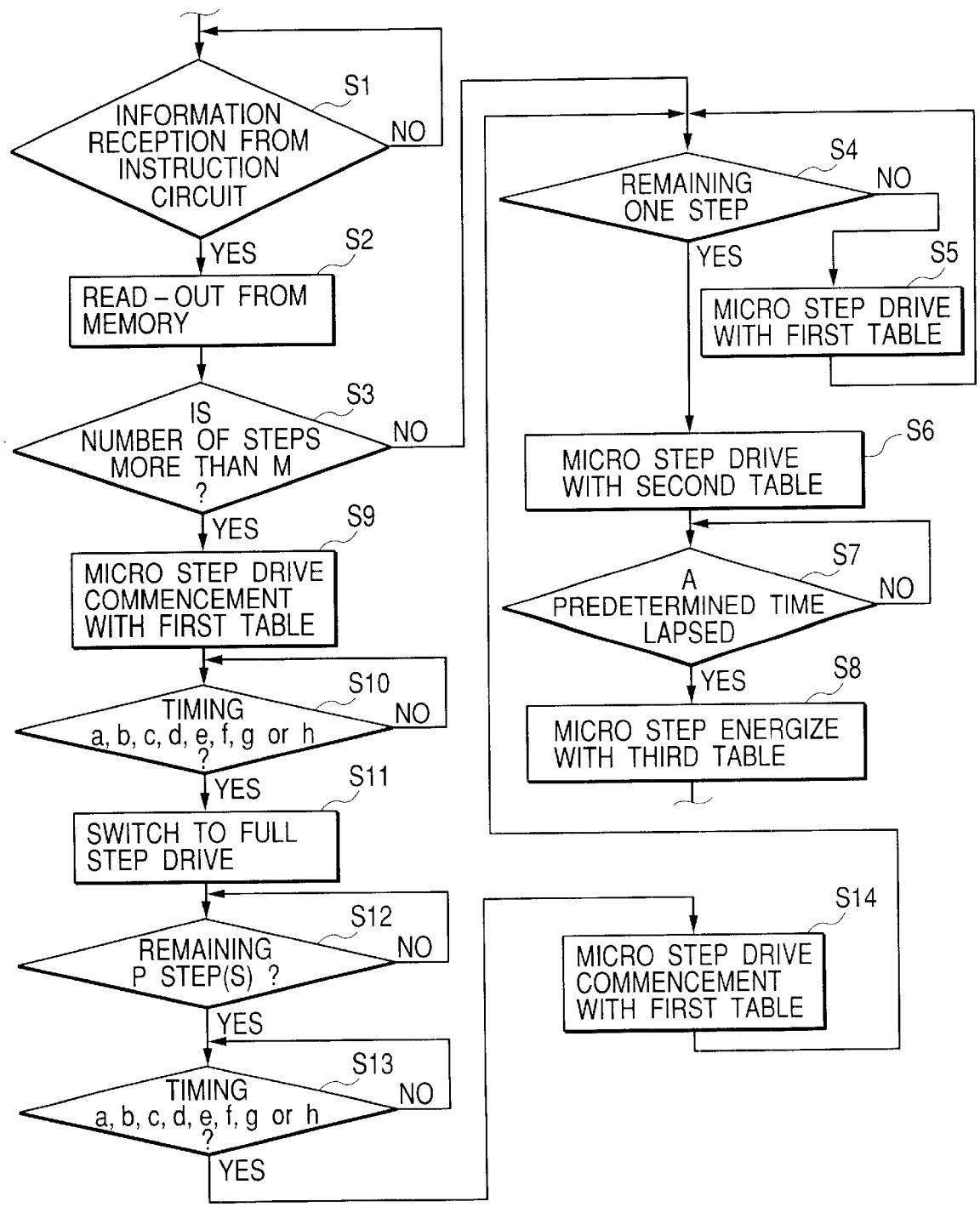
FIG. 10 is a flowchart illustrating the operation of a control circuit according to the embodiment of the present invention.
Figure 11:
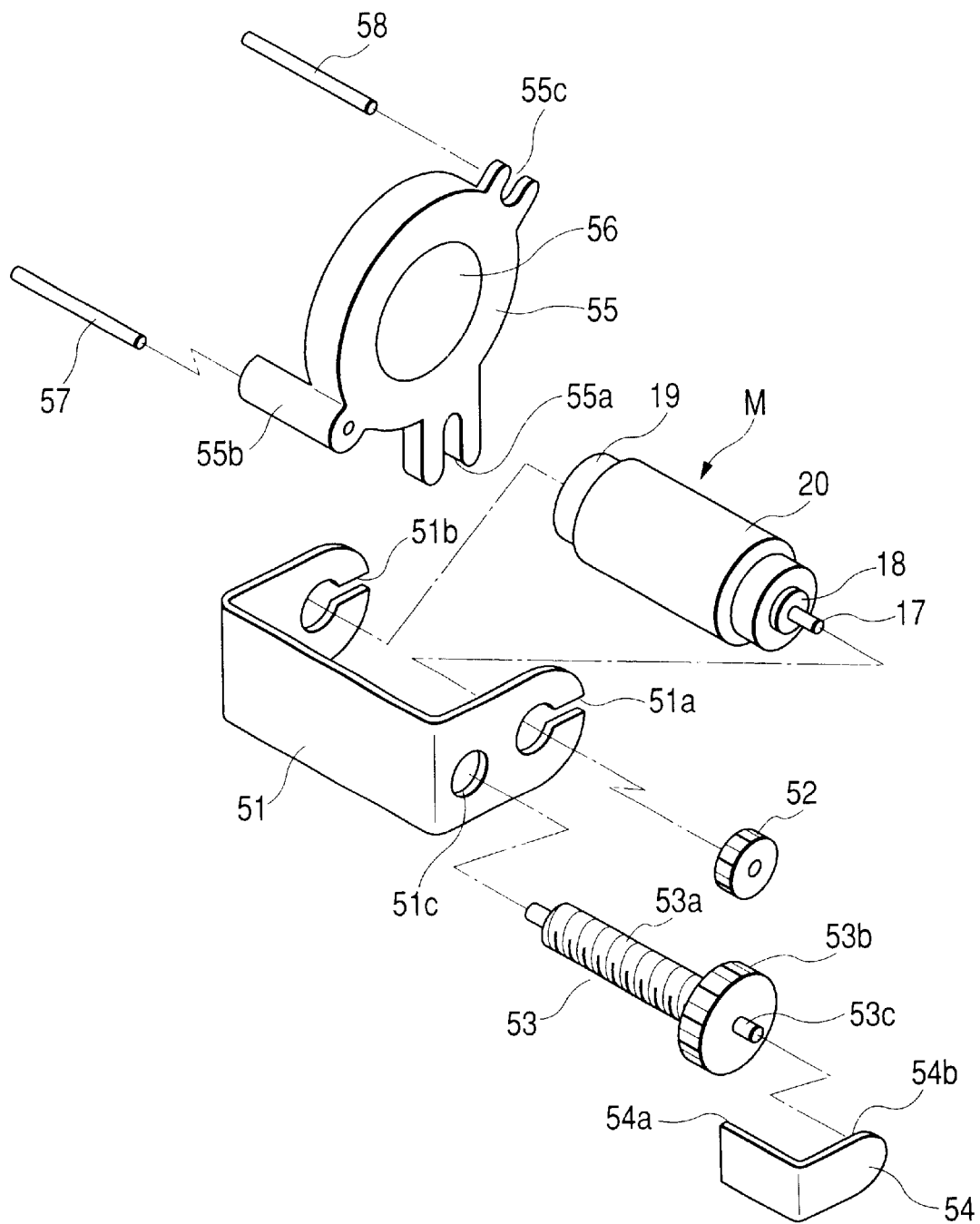
FIG. 11 is an exploded perspective view of a lens moving device using as its driving source the stepping motor according to the embodiment of the present invention.
Figure 12:
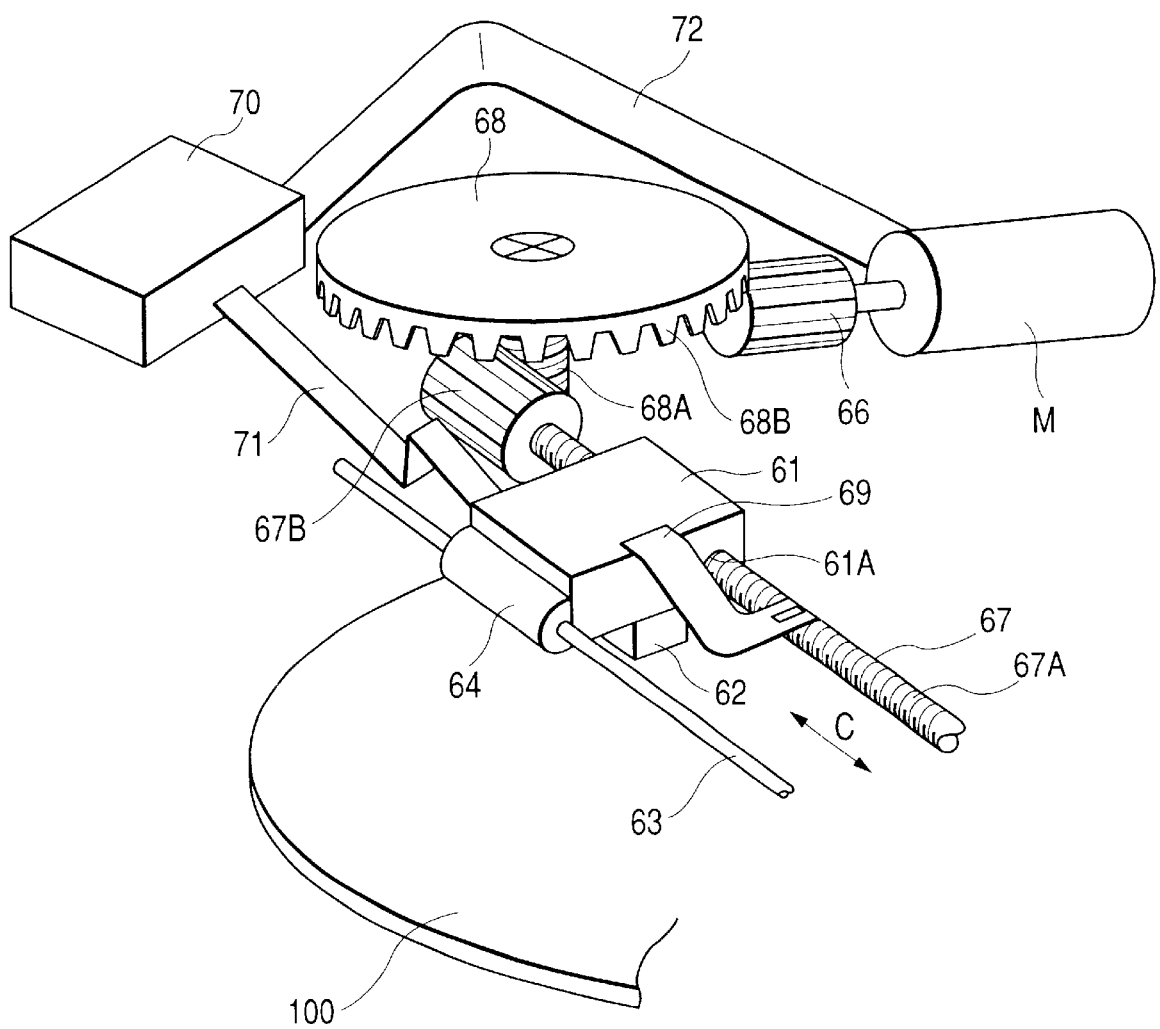
FIG. 12 is a perspective view illustrating a case where the stepping motor of the embodiment is employed in a pickup device for magneto-optical disks.
Figure 13:
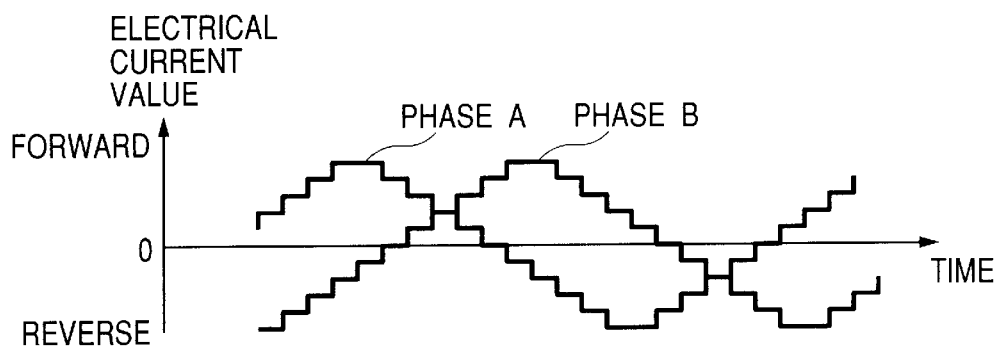
FIG. 13 is a graph illustrating a typical method of energization in a micro-step driving system.
Figure 14:
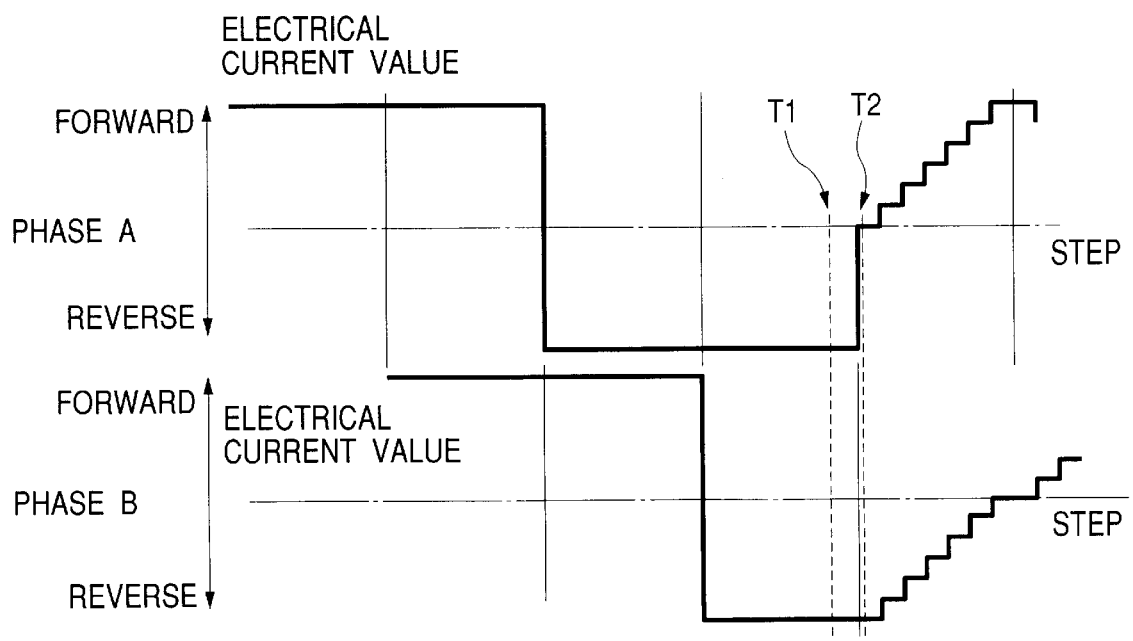
FIG. 14 is a graph illustrating states of energizing current in a conventional driving device at the time of switching from the full-step driving mode to the micro-step driving mode.
Figure 15:
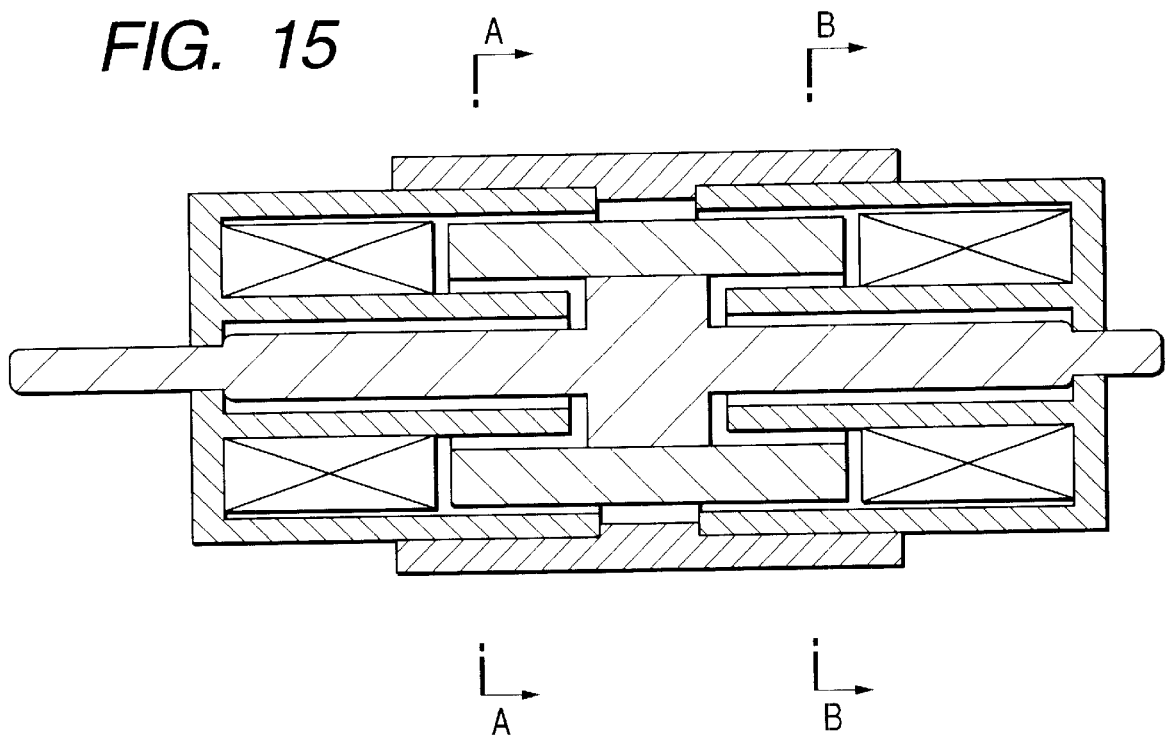
FIG. 15 is a sectional view of a stepping motor.
Figure 16A:
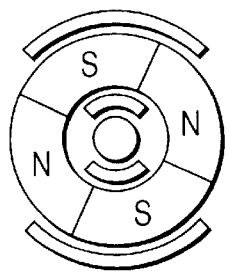
FIGS. 16A and 16B are sectional views illustrating a relationship between a stator and a rotor.
Figure 16B:
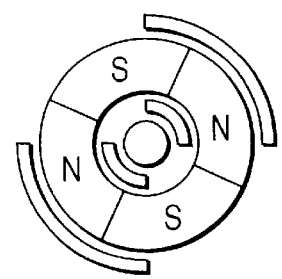
Figure 17A:
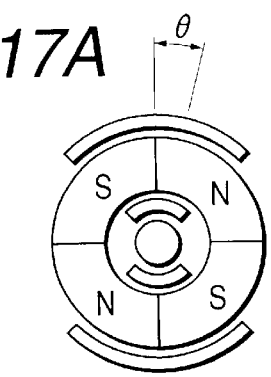
FIGS. 17A and 17B are sectional views illustrating a relationship between the stator and the rotor.
Figure 17B:
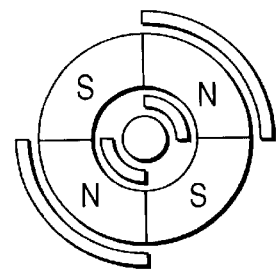

FIG. 1 is a block diagram illustrating electric circuitry of a driving device according to one preferred embodiment of the present invention. FIG. 2 is an exploded perspective view of a stepping motor used in the embodiment. FIG. 3 is a sectional view in an axial direction of the stepping motor after assembled. FIGS. 4A to 4D are sectional views taken by A—A line in FIG. 3, and FIGS. 4E to 4H are sectional views taken by B—B line in FIG. 3. FIGS. 5A and 5B illustrates a relationship between energizing current to coils and elapsed time at the time of full-step driving. FIGS. 6 and 7 illustrate energizing current to the coils at each step of the first and second micro-step driving tables. FIG. 8 illustrates states of energizing current in both the micro-step driving mode and the full-step driving mode. FIG. 9 is illustrates states of energizing current at the time of switching from the full-step driving mode to the micro-step driving mode. FIG. 10 is a flowchart illustrating the operation of the driving circuit. FIG. 11 is an exploded perspective view of a lens moving device using as its driving source the stepping motor according to the embodiment of the present invention. FIG. 12 is a perspective view illustrating a case where the stepping motor of the embodiment is employed in a pickup device for magneto-optical disks.

In FIG. 1, the driving device includes a stepping motor M, a driving circuit 1, a control circuit 2, a memory (storage circuit) 3, and an instruction circuit 4. The driving circuit 1 is to pass energizing current through coils in the motor M as defined by and instructed from the control circuit 2. For example, the driving circuit 1 is composed of four transistors and H circuits equivalent in number to phases of coils so that the coils can be selectively energized in both normal and reverse directions. Since this embodiment assumes use of a two-phase stepping motor, the driving device is provided with at least two H circuits. The instruction circuit 4 inputs to the control circuit 2 data on the rotational direction and driving amount (number of steps) of the motor.

The memory 3 is a nonvolatile memory. The memory 3, to be described later in detail, stores first, second and third micro-step driving tables all of which contain data for the same number of steps. Each of the three micro-step driving tables contains combinations of PMW (Pulse Width Modulation) values for energizing respective phases of the coils in the stepping motor M. The second micro-step driving table takes at least partially different values from the combinations of PWM values of the first micro-step driving table for energizing respective phases of the coils. The third micro-step driving table takes smaller values of combinations of PWM values than those of the second micro-step driving table.

In the embodiment, the PWM values of the second micro-step driving table are larger than those of corresponding steps of the first micro-step driving table. Therefore, the use of the second micro-step driving table increases both the current consumption and the driving force compared to the use of the first micro-step driving table. Further, the use of the third micro-step driving table reduces both the current consumption and the driving force compared to the use of the second micro-step driving table.

The control circuit 2 sends a signal to the driving circuit 1 to drive the motor M according to the driving amount input from the instruction circuit 4. In this operation, the control circuit 2 selects any one of the first to third micro-step driving tables stored in the memory 3 according to the number of steps to be driven, so that each phase of the coils is energized with a combination of PWM values specified in the selected table.

The embodiment uses a stepping motor as disclosed in U.S. Pat. No. 5,831,356.

In FIGS. 2, 3 and 4A to 4H, the reference numeral 11 designates a cylindrical magnet that assumes part of a rotor of the motor. The magnet 11 is divided in the circumferential direction into n parts (four parts in the embodiment) which have south and north magnetic poles alternately. These magnetized portions are designated as magnetized portions 11a, 11b, 11c and 11d, respectively, in which the magnetized portions 11a and 11c are magnetized to a south pole, and the magnetized portions 11b and 11d are magnetized to a north pole.

The reference numeral 17 designates an output shaft as the rotor shaft, and is fitted into and fixed to the magnet 11 as the rotor. The output shaft 17 and the magnet 11 constitute the rotor.

The reference numerals 12 and 13 designate cylindrical coils, which are arranged coaxially with respect to the magnet 11 and before and behind the magnet 11 respectively so that they will sandwich the magnet 11. The coils 12 and 13 are formed to have substantially the same outside diameter as the magnet 11.

The reference numerals 18 and 19 designate first and second stators made of soft magnetic material. The first and second stators 18 and 19 are out of phase with each other by 180/n, that is, 45 degrees. Each of the first and second stators 18 and 19 is composed of outer and inner cylinders.

The coil 12 is mounted between the outer and inner cylinders of the first stator 18. In operation, the coil 12 is energized to excite the first stator 18.

The leading end portions of the outer and inner cylinders of the first stator 18 form outside magnetic poles 18a and 18b and inside magnetic poles 18c and 18d. The inside magnetic poles 18c and 18d are shifted from each other by 360/(n/2), that is, 180 degrees, so that they will be in phase with each other. Further, the outside magnetic poles 18a and 18b are arranged opposite to the inside magnetic poles 18c and 18d, respectively.

The outside and inside magnetic poles 18a, 18b and 18c, 18d of the first stator 18 are so provided that they sandwich one end portion of the magnet 11 with opposing the one end of the outer and inner peripheries of the magnet 11. Further, one end of the rotating shaft 17 is rotatably engaged into a hole 18e of the first stator 18.

On the other hand, the coil 13 is mounted between the outer and inner cylinders of the second stator 19. In operation, the coil 13 is energized to excite the second stator 19. The leading end portions of the outer and inner cylinders of the second stator 19 form outside magnetic poles 19a and 19b and inside magnetic poles 19c and 19d. The inside magnetic poles 19c and 19d are shifted from each other by 360/(n/2), that is, 180 degrees, so that they will be in phase with each other. Further, the outside magnetic poles 19a and 19b are arranged opposite to the inside magnetic poles 19c and 19d, respectively.

The outside and inside magnetic poles 19a, 19b and 19c, 19d of the second stator 19 are so provided that they sandwich the other end portion of the magnet 11 with opposing the other end of the outer and inner peripheries of the magnet 11. Further, the other end of the rotating shaft 17 is rotatably engaged into a hole 19e of the second stator 19.

According to the above-mentioned configuration, a magnetic flux generated by energizing the coil 12 can pass across the magnet 11 between the outside magnetic poles 18a, 18b and the inside magnetic poles 18c, 18d, which assures an efficient effect on the magnet 11. The coil 13 and the stator 19 can also provide the same effect on the magnet 11. Thus the power of the motor can be enhanced.

The reference numeral 20 designates a cylindrical coupling ring made of nonmagnetic material. Grooves 20a and 20b are provided at one end side of the inner portion of the coupling ring 20, while grooves 20c and 20d are so provided at the other end in a state in which they are out of phase with each other by 45 degree. The outside magnetic poles 18a and 18b of the first stator 18 are fitted into the grooves 20a and 20b, and the outside magnetic poles 19a and 19b of the second stator 19 are fitted into the groove 20c and 20d, by fixing these fitted portions with adhesive. Thus the first and second stators 18 and 19 are attached to the coupling ring 20.

The first and second stators 18 and 19 are such that respective leading ends of the outside and inside magnetic poles are opposed to each other. The outside magnetic poles 18a, 18b and the outside magnetic poles 19a, 19b are fixed to the coupling ring 20 with spaces corresponding to the width of protruding portions 20e and 20f. The protruding portions 20e and 20f protrude from the inner surface of the coupling ring 20 between the outside magnetic poles 18a, 18b and the outside magnetic poles 19a, 19b, respectively.

FIG. 3 is a sectional view of the stepping motor. FIGS. 4A through 4D are sectional views taken by A—A line in FIG. 3, and FIGS. 4E through 4H are sectional views taken by B—B line in FIG. 3. FIGS. 4A and 4E, FIGS. 4B and 4F, FIGS. 4C and 4G and FIGS. 4D and 4H show the same time period, respectively.

The following describes the operation of the stepping motor. When the coils 12 and 13 are energized from the states of FIGS. 4A and 4E, the outside magnetic poles 18a, 18b of the first stator 18 are magnetized to the north pole, and the inside magnetic poles 18c, 18d to the south pole. On the other hand, the outside magnetic poles 19a, 19b of the second stator 19 are magnetized to the south pole, and the inside magnetic poles 19c, 19d to the north pole. As a result, the magnet 11 as the rotor rotates 45 degrees counterclockwise. This state is shown in FIGS. 4B and 4F.

Then the direction of energization of the coil 12 is reversed to magnetize the first and second stators 18 and 19 in the following manner. In other words, the outside magnetic poles 18a, 18b and 19a, 19b are magnetized to the south pole, and the inside magnetic poles 18c, 18d and 19c, 19d to the north pole, respectively. As a result, the magnet 11 as the rotor further rotates 45 degrees counterclockwise. This state is shown in FIGS. 4C and 4G.

Then the direction of energization of the coil 13 is reversed to magnetize the first and second stators 18 and 19 in the following manner. In other words, the outside magnetic poles 19a, 19b of the second stator 19 are magnetized to the north pole, and the inside magnetic poles 19c, 19d to the south pole. On the other hand, the outside magnetic poles 18a, 18b of the first stator 18 are magnetized to the south pole, and the inside magnetic poles 18c, 18d to the north pole. As a result, the magnet 11 as the rotor further rotates 45 degrees counterclockwise. This state is shown in FIGS. 4D and 4H.

After that, the directions of energization of the coils 12 and 13 are switched sequentially so that the magnet 11 as the rotor will rotate to change its position according to the phase of energization. It should noted that if the direction of energization of the coils are switched from the states shown in FIGS. 4D and 4H to those shown in FIGS. 4C and 4G, FIGS. 4B and 4F, and FIGS. 4A and 4E in this order, the magnet 11 will rotate clockwise.

The above describes a full-step driving mode in which energization of the coils 12 and 13 are switched at a fixed value. FIGS. 5A and 5B show states of energizing current applied in this mode to the coils 12 and 13, respectively.

The above-mentioned micro-step driving operation stops the magnet 11 or the rotor in a position between the positions shown in FIGS. 4A through 4H by varying the ratio of values of current passed through the coils 12 and 13. The present invention further adds the following energization control process to the above-mentioned micro-step driving operation.

FIG. 6 illustrates a relationship between energizing current to the coils 12, 13 and the number of steps when the coils 12 and 13 are energized on the basis of the first micro-step driving table stored in the memory 3. The memory 3 stores (A1, B1), (A2, B2), (A3, B3), . . . , (Am, Bm) as the first micro-step driving table. These data (A1, B1), (A2, B2), (A3, B3), . . . , (Am, Bm) indicate ratios of current values for energizing the coils 12 and 13. A1, A2, A3, . . . , Am indicate ratios of current values for energizing the coil 12, and B1, B2, B3, . . . , Bm indicate ratios of current values for energizing the coil 13. The current values may be changed by pulse width modulation of applied voltage (by PWM control). If such an energizing technique is used, data on duty values for energization will be stored in the first, second and third micro-step driving tables. The technique for changing current values, of course, is not limited to the pulse width modulation (PWM control).

FIG. 7 illustrates a relationship between energizing current to the coils 12, 13 and the number of steps when the coils 12 and 13 are energized on the basis of the second micro-step driving table stored in the memory 3. The memory 3 stores (C1, D1), (C2, D2), (C3, D3), . . . , (Cm, Dm) as the second micro-step driving table. These data (C1, D1), (C2, D2), (C3, D3), . . . , (Cm, Dm) indicate ratios of current values for energizing the coils 12 and 13. C1, C2, C3, . . . , Cm indicate ratios of current values for energizing the coil 12, and D1, D2, D3, . . . , Dm indicate ratios of current values for energizing the coil 13. Part or all of the values are different between the first micro-step driving table and the second micro-step driving table. In the embodiment, the second micro-step driving table has larger PWM values throughout the entire period of micro-step driving than those of the first micro-step driving table.

For example, as shown in FIG. 6, data indicative of the maximum value of the first micro-step driving table are A5, A6 and B10, B11, the current value of which is set to 80% of that of the full-step driving. On the other hand, as shown in FIG. 7, data indicative of the maximum value of the second micro-step driving table are C5, C6 and D10, D11 the current value of which is set to 100% of that of the full-step driving. In other words, a comparison between (Cm, Dm) and (Am, Bm) shows that the absolute value of (Cm, Dm) is set larger than that of (Am, Bm). Further, the value of Cm/Dm and the value of Am/Bm, each of which indicates the energization ratio of the coil 13 to the coil 12, become similar to each other but do not match with each other. First of all, the absolute value of (Cm, Dm) is set larger than that of (Am, Bm) in response to the above-mentioned need to increase the driving force in case of use of the second micro-step driving table.

It is also necessary to set the value of Cm/Dm and the value of Am/Bm, each of which indicates the energization ratio of the coil 13 to the coil 12, similar to each other but not to match with each other. This is because the rotational positions of the rotor need to be aligned between the driving mode by energization on a (Cm, Dm) basis and the driving mode by energization on a (Am, Bm) basis. The rotational position of the rotor is decided by combining a force of attraction by which the rotor magnet is attracted to the stators 18, 19, and a magnetic force generated by energizing the coils 12, 13. Since the absolute value of the combination of (Cm, Dm) is set larger than that of the combination of (Am, Bm), the combination of (Cm, Dm) has a larger value of magnetic force generated by energizing the coils 12, 13 than that of the combination of (Am, Bm). This makes a difference in the ratio between the force of attraction by which the rotor magnet is attracted to the stators 18, 19, and the magnetic force generated by energizing the coils 12, 13. If the value of Cm/Dm and the value of Am/Bm exactly match with each other, the rotational position of the rotor in the combination of (Cm, Dm) will vary from that in the combination of (Am, Bm). Therefore, the value of Cm/Dm needs to be so set that the rotational position of the rotor in combination of (Cm, Dm) will aligned with that in combination of (Am, Bm). For this, the force of attraction by which the rotor magnet is attracted to the stators 18, 19 needs to be taken into account in addition to the magnetic force.

In the embodiment, two cycles of energization of the coils 12, 13 switched according to the steps of (A1, B1), (A2, B2), (A3, B3), . . . , (Am, Bm) turn the magnet 11 fully once in the counterclockwise direction. Similarly, two cycles of energization of the coils 12, 13 switched according to the steps of (C1, D1), (C2, D2), (C3, D3), . . . , (Cm, Dm) turn the magnet 11 fully once in the clockwise direction. For example, if m is 20, the magnet 11 as the rotor makes a turn at every 40 steps.

The following describes switching between the full-step driving mode and the micro-step driving mode.

In the embodiment, the magnet or rotor is driven to rotate in the micro-step manner during startup and gradually accelerated. Then if the speed or the number of pulses exceeds a predetermined value, the micro-step driving mode is switched to the full-step driving mode to drive the magnet or rotor to rotate at high speed. Finally, if an object driven by the stepping motor approaches a position which has a predetermined amount left until the object reaches the target location, the mode is switched again to the micro-step driving mode for precise positioning.

FIG. 8 illustrates states of energizing current in both the micro-step driving mode and the full-step driving mode.

Switching from the micro-step driving mode to the full-step driving mode, or from the full-step driving mode to the micro-step driving mode is carried out when the absolute values of energizing current for respective phases (A phase and B phase in the embodiment) match with each other during the micro-step energizing cycle. These times are indicated with a, b, c and d in FIG. 8. In other words, the absolute values of energizing current for respective (or both) phases match or nearly match with each other at these times a, b, c and d during the micro-step energizing cycle. For example, the full-step driving mode is switched to the micro-step driving mode at time b. FIG. 9 illustrates sate of energizing current at this switching timing.

If energizing current continuously varies, values of energizing current for respective phases match with each other at least once without fail. On the other hand, if energizing current varies in stepwise fashion according to a micro-step driving table, values of energizing current for respective phases do not always match with each other. In this case, the driving mode is switched when the absolute values of energizing current for respective phases nearly match with each other.

At the above-mentioned switching timing, the ratio of energizing current between the two coils is 1:1 or nearly 1:1 in both the micro-step driving mode and the full-step driving mode. Since the ratio of energizing current between the phases does not vary at the time of switching the driving mode, the rotational position of the rotor is not varied by switching the driving mode. Therefore, even if switching from the full-step driving mode to the micro-step driving mode, or from the micro-step driving mode to the full-step driving mode is carried out, the rotation of the rotor can be smoothly shifted. This makes it possible to prevent conditions of the stepping motor from moving out of adjustment at the time of switching the mode. The same thing can be said for the times e, f, g and h in FIG. 6 and FIG. 7.

Referring next to the flowchart of FIG. 10, the operation of the control circuit 2 will be described.

Step 1: The control circuit 2 receives information (direction of rotation and the number of steps) instructed from the instruction circuit 4.

Step 2: The control circuit 2 reads out the first, second and third micro-step driving tables stored in the memory 3. The first and second micro-step driving tables have already been described using FIGS. 6 and 7. The third micro-step driving table has values of energizing current the absolute values of which are set smaller than at least those of energizing current passed through according the second micro-step driving table (Cm, Dm). This table represents the combination of PWM values as (Em, Fm).

After completion of positioning operation in the micro-step driving mode, a frictional force is so exerted on the rotor that it makes the rotor keep its current rotational position. Therefore, even if current passed through the coils is reduced after positioning so that the coils will weaken their magnetic force, the frictional force can prevent further rotation of the magnet caused by a force of attraction between the magnet and the stators. In other words, a predetermined-level or higher magnetic force has only to be produced after positioning so that the magnet can keep its current rotational position. If the driving system allows only for maintaining the position of the magnet, current passed through the coils can be made small. Then if the current is made small, current consumption can be reduced, which in turn prevents overheating of the motor.

Step 3: If the number of steps, contained in the information received from the instruction circuit 4, is a predetermined value M or more, the control procedure goes to step 9. If it is less than the predetermined value M, the control procedure goes to step 4. In the embodiment, the predetermined value M is a value of a number or larger decided by adding two pulses to the number of micro-steps corresponding to the amount of rotation for one step of the full-step driving. In other words, the predetermined value M is set to 5+2=7 or larger. Suppose that the predetermined value M is seven. Suppose further that the current feed amount is six steps or less in the micro-step operation. In this case, it is determined that the number of remaining steps is not enough to switch to the full-step driving mode, and the control procedure goes to step 4.

Step 4: If the number of remaining steps is two or more, the control procedure goes to step 5, or if it is one, the control procedure goes to step 6.

Step 5: The control circuit 2 actuates the driving circuit 1 on the basis of the first micro-step driving table read out of the memory 3 so that the magnet 11 will rotate in a predetermined direction in accordance with the information received from the instruction circuit 4.

Step 6: The control circuit 2 actuates the driving circuit 1 on the basis of the second micro-step driving table so that the magnet 11 will rotate at the final step. Since the final step driving decides the final stopping position, it is necessary to accurately position the rotor according to the electrical signal. As mentioned above, the micro-step control operation reduces the driving force of rotor's rotation for positioning as the position of the rotor is approaching a predetermined location. In this case, the accuracy of positioning the rotor is susceptible to a little frictional force, which makes precise positioning hard. Therefore, the control circuit 2 actuates the driving circuit 1 on the basis of the second micro-step driving table only in this step. If in step 5 energization of the coils has been completed up to the values (A14, B14) of the first micro-step driving table, energization of the coils is carried out in this step on the basis of the values (C15, D15) of the second micro-step driving table. It should be noted that the second micro-step driving table has larger PWM values than those of the first micro-step driving table. In other words, current flown at the final step for stopping the rotor is made larger in magnitude than those of any previous micro-steps to increase the amount of driving so as to drive the rotor against the frictional force. The flow of larger current to increase the driving force makes possible accurate positioning of the rotor according to the electrical signal. Although driving on the basis of the second micro-step driving table increases current consumption, it is only for one step, and the energy loss does not affect the entire apparatus so much.

Step 7: When a predetermined time has elapsed after the magnet rotor was driven at the final step to rotate to a desired location, the control procedure goes to step S8.

Step 8: The control circuit 2 performs micro-step energization according to the third micro-step driving table read out of the memory 3, which keeps the rotational position of the magnet rotor positioned in step 6.

The current flown according to the third micro-step driving table (Em, Fm) is smaller in absolute value than that flown according to the second micro-step driving table (Cm, Dm). As mentioned above, even if the amount of energization of the coils is reduced after completion of positioning so that the coils will weaken their magnetic force, a frictional force can prevent further rotation of the magnet due to a force of attraction between the magnet and the stators. If the driving system allows only for maintaining the position of the magnet, current passed through the coils can be made small. Then if the current is made small, current consumption can be reduced, which in turn prevents overheating of the motor. In this step, after completion of positioning on the basis of the information received from the instruction circuit 4, the control circuit 2 waits for the next operation.

The following describes a case where the number of steps contained in the information received in step 3 from the instruction circuit 4 is the predetermined value M or more.

Step 9: The control circuit 2 actuates the driving circuit 1 on the basis of the first micro-step driving table read out of the memory 3 so that the magnet 11 will rotate in a predetermined direction in accordance with the information received from the instruction circuit 4.

Step 10: The control circuit 2 judges whether the energized state comes to any one of the times a, b, c and d in FIG. 9 or e, f, g and h in FIG. 6 during micro-step driving started in step 9. If the energized state comes to any one of the times a through h, the control procedure goes to step 11. At these times a through h, both the micro-step driving and the full-step driving shows a 1:1 or nearly 1:1 ratio of energizing current for respective phases. Since the ratio of energizing current between the phases does not vary even if the driving mode is switched, the rotation of the rotor is shifted smoothly even if the driving mode is switched. This makes it possible to prevent conditions of the stepping motor from moving out of adjustment at the time of switching the mode.

Step 11: The control circuit 2 switches the motor's driving mode from the micro-step driving mode to the full-step driving mode. The rotor is accelerated enough at the time the control procedure goes to step 11. Therefore, the motor is driven to rotate in this step and the following step in such a full-step manner that both the output torque and the rotational speed are higher than those of the micro-step driving operation.

Step 12: If the number of remaining steps to the number of steps contained in the information received from the instruction circuit 4 is a predetermined number P or less, the control procedure goes to step 13. In the embodiment, the predetermined value P is a value decided by adding one pulse or more to the number of micro-steps corresponding to the amount of rotation for one step of the full-step driving. In other words, the predetermined value P is set to 5+1=6 or larger.

Step 13: The control circuit 2 switches the full-step driving mode started from step 11 to the micro-step driving mode. Switching to the micro-step driving mode is carried out at any one of the times a, b, c and d in FIG. 9 or e, f, g and h in FIG. 6. At these times, both the micro-step driving and the full-step driving shows a 1:1 or nearly 1:1 ratio of energizing current for respective phases. Since the ratio of energizing current between the phases does not vary even if the driving mode is switched, the rotation of the rotor is shifted smoothly even if the driving mode is switched. This makes it possible to prevent conditions of the stepping motor from moving out of adjustment at the time of switching the mode.

In the above-mentioned embodiment, it is judged in step 10 just after the micro-step driving is started on the basis of the first table whether the current micro step comes to any one of the times a through h shown in FIGS. 6 and 9. This judgment, of course, may be made after the motor rotates a few cycles. Further, a shift from the micro-step driving to the full-step driving may be carried out at the time the absolute values of energizing current for respective phases match or nearly match with each other. In other words, the motor may be switched to the full-step driving mode after accelerated enough in the micro-step manner.

As mentioned above, either the first micro-step driving table or the second micro-step driving table is selected according to the number of steps remaining before the driven object reaches the desired location. This makes it possible to provide a stepping motor capable of performing accurate positioning with reducing power consumption and overheat thereof.

FIG. 11 is an exploded perspective view of a lens moving device using the above-mentioned stepping motor as its driving source.

In FIG. 11, the reference numeral 51 designates a frame formed in a shape of the letter U. The end portions of the main body part (stators to be described later) of the stepping motor M are fitted into and retained by supporting holes 51*a*, 51*b* formed at both ends of the frame 51. A pinion gear 52 is fitted into and fixed to the output shaft 17 of the stepping motor M. The reference numeral 53 designates a leading screw shaft (driving shaft) in which as part thereof a leading screw portion 53*a* is formed to have a length equivalent to the length of the main body of the stepping motor M. The leading screw shaft 53 is rotatably fitted into and retained by supporting holes 51*d*, 51*c* formed at both ends of the frame 51. Thus the stepping motor M and the leading screw shaft 53 are so arranged by the frame 51 that the output shaft 17 and the leading screw shaft 53 extend in parallel with each other in their radial direction (so-called parallel arrangement).

A gear portion 53*b* is also provided at one end of the leading screw shaft 53 so that it will be engaged with the pinion gear 52. Therefore, the rotation of the stepping motor M drives the leading screw shaft 53 to rotate.

The reference numeral 54 designates an L-shaped plate spring. A base end portion 54*a* of the plate spring 54 is fixed onto the frame 51 so that an arm portion 54*b* having spring properties will press an end portion 53*c* of the leading screw shaft 53. Therefore, the leading screw shaft 53 is biased to the frame 51, preventing backlash in the thrust direction between the leading screw shaft 53 and the frame 51. The reference numeral 56 designates a lens and the reference numeral 55 is a lens holder (driven object) for holding the lens 56. The lens holder 56 is provided with a contact portion 55*a* with a female screw provided therein. The contact portion 55*a* (female screw) is in contact with (and is engaged with) the leading screw portion 53*a* of the leading screw shaft 53. Further, a guide hole 55*b* and a non-runout groove 55*c* are formed in the lens holder 55 so that guide bars 57, 58 supported by a ground plate, not shown, will be fitted thereinto, respectively. Thus the guide bars 57, 58 guide the lens holder 55 in an optical direction in such condition that the rotation of the lens holder 55 about the optical axis will be restricted.

In the lens driving device thus configured, the leading screw shaft 53 is rotated by the rotation of the stepping motor M. Then the lens holder 55 receives an axial driving force in the contact portion 55*a* from the leading screw portion 53*a* to move together with the lens 56 in the optical direction according to the rotational amount and rotational direction of the stepping motor M.

It should be noted that, as mentioned above, the stepping motor M and the leading screw shaft 53 are so arranged that the output shaft 17 and the leading screw shaft 53 are in parallel with each other. This parallel arrangement can reduce the entire length of the apparatus compared to a serial arrangement of the stepping motor M and the leading screw shaft 53. Since the entire length of the apparatus is reduced, the leading screw shaft 53 can be formed throughout almost the entire length, thereby setting the moving range of the lens 56 large.

Further, according to this layout of the apparatus, the length of the stepping motor M has little effect on the length of the lens driving device. Therefore, the stepping motor can be made large to increase the driving force.

The above-mentioned lens holder 55 and lens 56 are driven in a full-step manner when they are roughly moved, or in a micro-step manner when they need to be moved up to a predetermined location with fine pitches. When the stepping motor M is driven counterclockwise in the micro-step manner, data stored in the first micro-step driving table is used. On the other hand, when the stepping motor M is driven clockwise in the micro-step manner to move the lens holder 55 and the lens 56 to the predetermined location, data stored in the second micro-step driving table is used.

The rotational position of the magnet 11 as the rotor of the stepping motor M slightly varies between the counterclockwise positioning operation and the clockwise positioning operation because of use of different tables. This slight variation cancels backlash between the contact portion 55*a* of the lens holder 55 and the leading screw portion 53*a* of the leading screw shaft 53, backlash between the gear portion 53*b* of the leading screw shaft 53 and the pinion gear 52, or an effect of inertial friction on the sliding portion of the lens holder 55. This makes it possible to place the lens holder 55 and the lens 56 precisely in position even if they are stopped from either rotational direction.

The lens driving device has such a configuration that the lens is moved in parallel with the optical axis, but it may have another configuration which moves the lens in a direction perpendicular to the optical axis. For example, the above-mentioned driving device is applicable to a pickup device for reading or writing information stored on a magneto-optical disk. FIG. 12 is a perspective view illustrating the appearance of a driving device applied to such a pickup device.

The reference numeral 100 designates a magneto-optical disk as a disk-shaped information recording medium. Recording tracks are formed on the magneto-optical disk at intervals of a few μm. In operation, a spot of a few μm in diameter is formed from an optical beam to perform optical processing, for example, to record magnetic information or reproduce optically recorded information.

The reference numerals 61 and 62 designate a carriage and a pickup, respectively. The pickup 62 is composed of a light source for irradiation, a light-receiving element, and a lens for focusing a reflected light on the light-receiving element.

The reference numeral 63 designates a guide shaft of which both ends are fixed to the main body. The reference numeral 64 designates a slider into which the guide shaft 63 fixed to the carriage 61 is slidably fitted. The motor M is fixed to the main body. The reference numeral 66 designates a pinion gear fixed to the output shaft of the motor M. The reference numeral 67 designates a leading screw shaft rotatably mounted on the main body side. A leading screw portion 67A of the leading screw shaft 67 is screwed into a female screw portion 61A of the carriage 61, with a helical gear 67B formed at one end of the leading screw portion 67A. The reference numeral 68 designates a deceleration gear rotatably mounted in the main body. The deceleration gear 68 is composed of a worm portion 68A and a crown gear portion 68B. The worm portion 68A is engaged with the helical gear 67B of the leading screw shaft 67, while the crown gear portion 68B is engaged with the pinion gear 66. In the above-mentioned configuration, the motor M is so driven that the carriage 61 and the pickup 62 will be scanned along the surface of the magneto-optical disk 100 in the direction of arrow C.

The reference numeral 69 designates a plate spring with one end fixed to the carriage 61 and the other end pressing the leading screw portion 67A of the leading screw shaft 67. Since the plate spring 69 presses the leading screw portion 67A, backlash between the female screw portion 61A of the carriage 61 and the leading screw portion 67A is prevented. The reference numeral 70 designates electrical control circuitry provided in the main body and including at least the driving circuit 1, the memory 3 and the control circuit 2 shown in FIG. 1. A flexible printed board 71 electrically connects the pickup 62 and the electrical control circuitry 70. A flexible printed board 72 electrically connects the motor M and the electrical control circuitry 70.

The motor M rotates in normal and reverse directions so that the pickup 62 will be scanned along the magneto-optical disk 100 in the direction of arrow C.

Even in the above-mentioned configuration, positioning, of course, can be carried out using the above-mentioned first, second and third micro-step driving tables.

The above-mentioned embodiment described as an example the driving device for the two-phase stepping motor. However, the stepping motor is not necessary of two phases, and any number of phases may be adopted as long as current passed through the motor can be made large in magnitude in the final one step before stop of the motor. Further, the current passed through the motor may be made large for two or more pulses, not for the final pulse. The more the number of pulses with large energizing current increases, the higher the current consumption will be. It is therefore preferable to set the number of pulses with large energizing current so that positioning accuracy and current consumption brought into balance.

What is claimed is:

1. A driving device for a stepping motor comprising:
    a setting circuit for setting the number of driving steps of the stepping motor;
    a storage circuit for storing a first driving table containing energizing amount data for each step at which the stepping motor is energized and driven in a micro-step manner, and a second driving table containing energizing amount data different in value from the first driving table; and
    a driving circuit for energizing the stepping motor during the driving steps set in number by said setting circuit according to the energizing amount data of the first or second driving table,
    wherein said driving circuit selects either the first or second driving table according to the number of remaining steps to be driven.

2. The device according to claim 1, wherein the first and second driving tables have energizing amount data corresponding to the same step, and the energizing amount data of the second driving table are set larger than those corresponding to the same step of the first driving table.

3. The device according to claim 2, wherein said driving circuit energizes the stepping motor on the basis of the energizing amount data of the first driving table and, at a predetermined number of final steps remaining in the number of driving steps set by said setting circuit, it energizes the stepping motor on the basis of the energizing amount data of the second driving table.

4. The device according to claim 2, wherein the energizing amount data indicate the magnitude of current passed through each phase of the stepping motor.

5. The device according to claim 2, wherein the second driving table contains energizing amount data different from the first driving table in the ratio of the energizing amount between respective phases at the same step.

6. The device according to claim 3, further comprising:
    a third driving table containing energizing amount data corresponding to the same step of those of the second driving table,
    wherein the energizing amount data of the third driving table are smaller in energizing amount than those corresponding to the same step of the second driving table.

7. The device according to claim 6, wherein said driving circuit energizes the stepping motor on the basis of the energizing amount data of the third driving table after energizing the stepping motor on the basis of the energizing amount data of the second driving table.

8. The device according to claim 3, wherein when the number of final steps remaining before reaching the number of driving steps set by said setting circuit is a predetermined number or more, said driving circuit energizes the stepping motor to drive the same in a full-step manner, or
    when the number of formal steps remaining before reaching the number of steps set by said setting circuit is less than the predetermined number, said driving circuit energizes the stepping motor to drive the same on the basis of the energizing amount data of the first driving table.

9. A stepping motor driving device comprising:
    a setting circuit for setting the number of driving steps of the stepping motor;
    a storage circuit for storing a driving table representing energizing amount data for each step at which the stepping motor is energized and driven in a micro-step manner; and
    a driving circuit for energizing the stepping motor during the driving steps set in number by said setting circuit,
    wherein said driving circuit energizes the stepping motor on the basis of the energizing amount data of the driving table, and at a predetermined number of final steps remaining in the number of driving steps, said driving circuit energizes the stepping motor in a different manner from that of the driving table.

10. The device according to claim 9, wherein said driving circuit passes a larger energizing current through the stepping motor than the energizing amount data of the driving table at the predetermined number of final steps.

11. The device according to claim 9, wherein said driving circuit passes a smaller energizing current through the stepping motor than that at the predetermined number of final steps after completion of energization at the number of driving steps set by said setting circuit.

12. The device according to claim 9, wherein the energizing amount data indicates combinations of PWM values of energizing current for each phase.

13. A lens driving device comprising:
   a stepping motor for moving a lens;
   a setting circuit for setting the number of driving steps of said stepping motor;
   a storage circuit for storing a first driving table containing energizing amount data for each step at which said stepping motor is energized and driven in a micro-step manner, and a second driving table containing energizing amount data difference in value from the first driving table; and
   a driving circuit for energizing said stepping motor during the driving steps set in number by said setting circuit according to the energizing amount data of the first or second driving table,
   wherein said driving circuit selects either the first or second driving table according to the number of remaining steps to be driven.

14. The device according to claim 13, wherein the first and second driving tables have energizing amount data corresponding to the same step, and the energizing amount data of the second driving table are set larger than those corresponding to the same step of the first driving table.

15. The device according to claim 13, wherein said driving circuit energizes said stepping motor on the basis of the energizing amount data of the first driving table, and at a predetermined number of final steps remaining in the number of driving steps set by said setting circuit, said driving circuit energizes said stepping motor on the basis of the energizing amount data of the second driving table.

16. A lens driving device comprising:
   a stepping motor for moving a lens;
   a setting circuit for setting the number of driving steps of said stepping motor;
   a storage circuit for storing a driving table representing energizing amount data for each step at which said stepping motor is energized and driven in a micro-step manner; and
   a driving circuit for energizing said stepping motor during the driving steps set in number by said setting circuit,
   wherein said driving circuit energizes said stepping motor on the basis of the energizing amount data of the driving table, and at a predetermined number of final steps remaining in the number of driving steps, said driving circuit energizes said stepping motor in a different manner from that of the driving table.

17. The device according to claim 16, wherein said driving circuit passes a larger energizing current through said stepping motor than the energizing amount data of the driving table at the predetermined number of final steps.

18. A driving apparatus for a stepping motor using a micro step driving mode, where an exciting current, which is increased and decreased step-by-step, is energized to each phase, comprising:
   a driving control circuit, which causes a drive circuit to perform energization to each phase by selecting one of a predetermined first combination of the energization values to each phase and a predetermined second combination of the energization values to each phase, which has a greater amount of energization compared to an amount of energization of the first combination,
   wherein one of the first combination and the second combination is selected depending upon a number of driving steps of the stepping motor.

19. A driving apparatus for a stepping motor using a micro step driving mode, where an exciting current, which is increased and decreased step-by-step, is energized to each phase, comprising:
   a drive control circuit, which causes a drive circuit to perform energization to each phase by selecting either a first combination of PWM values energized to each phase or a second combination having a larger whole PWM value compared to the first combination,
   wherein one of the first combination and the second combination is selected depending upon a number of driving steps of the stepping motor.

20. A driving apparatus for a stepping motor using a micro step driving mode, where an exciting current, which is increased and decreased step-by-step, is energized, comprising:
   a drive control circuit, which sets a number of driving steps of the stepping motor and which causes a drive circuit to perform energization by a predetermined first combination of the energization values,
   wherein said control circuit causes said drive circuit to perform energization by a predetermined second combination of the energization values, which has a greater amount of energization compared to an amount of energization of the first combination when the remaining number of driving steps of the stepping motor is equal to or less than a predetermined value.

21. A driving apparatus for a stepping motor using a micro step driving mode, where an exciting current, which is increased arid decreased step-by-step, is energized to each phase, comprising:
   a drive control circuit, which sets a number of driving steps of the stepping motor and which causes a drive circuit to perform energization to each phase by a predetermined first combination of the energization values to each phase,
   wherein said control circuit causes said drive circuit to perform energization to each phase by a predetermined second combination of the energization values to each phase, which has a greater amount of energization compared to an amount of energization of the predetermined first combination when the remaining number of driving steps of the stepping motor is equal to or less than a predetermined value.

22. A driving apparatus for a stepping motor using a micro step driving mode, where an exciting current, which is increased and decreased step-by-step, is energized to each phase, comprising:
   a drive control circuit, which sets a number of driving steps of the stepping motor and which causes a drive circuit to perform energization to each phase by a first combination of PWM values energized to each phase,
   wherein said control circuit causes said drive circuit to perform energization to each phase by a second combination having a larger whole PWM value compared to the first combination when the remaining number of driving steps of the stepping motor is equal to or less than a predetermined value.

23. A driving method for a stepping motor device comprising:

setting in a setting circuit the number of driving steps of the stepping motor;

storing in a storing circuit a driving table representing energizing amount data for each step at which the stepping motor is energized and driven in a micro-step manner; and energizing the stepping motor during the driving steps set in number in said setting step, wherein in said energizing step a driving circuit energizes the stepping motor on the basis of the energizing amount data of the driving table, and at a predetermined number of final steps remaining in the number of driving steps, be driving circuit energizes the stepping motor in a different manner from that of the driving table.

24. A driving method for a stepping motor using a micro step driving mode where an exciting current, which is increased and decreased step-by-step, is energized to each phase, comprising:

controlling a drive circuit to perform energization to each phase by selecting one of a predetermined first combination of the energization values to each phase and a predetermined second combination of the energization values to each phase, which has a greater amount of energization compared to an amount of energization of the first combination, wherein one of the first combination and the second combination is selected depending upon a number of driving steps of the stepping motor.

25. A driving method for a stepping motor using a micro step driving mode where an exciting current, which is increased and decreased step-by-step, is energized to each phase, comprising:

controlling a drive circuit to perform energization to each phase by selecting either a first combination of PWM values energized to each phase or a second combination having a larger whole PWM value compared to the first combination, wherein one of the first combination and the second combination is selected depending upon a number of driving steps of the stepping motor.

26. A driving method for a stepping motor using a micro step driving mode, where an exciting current, which is increased and decreased step-by-step, is energized, comprising:

setting in a drive control circuit a number of driving steps of the stepping motor and controlling a drive circuit to perform energization by a predetermined first combination of the energization values, wherein the drive control circuit causes the drive circuit to perform energization by a predetermined second combination of We energization values, which has a greater amount of energization compared to an amount of energization of the first combination when the remaining number of driving steps of die stepping motor is equal to or less than a predetermined value.

27. A driving method for a stepping motor using a micro step driving mode, where an exciting current, which is increased and decreased step-by-step, is energized to each phase, comprising:

setting in a drive control circuit, a number of driving steps of the stepping motor and controlling a drive circuit to perform energization to each phase by a predetermined first combination of the energization values to each phase, wherein the drive control circuit causes the drive circuit to perform energization to each phase by a predetermined second combination of the energization values to each phase, which has a greater amount of energization compared to an amount of energization of the predetermined first combination when die remaining number of driving steps of the stepping motor is equal to or less than a predetermined value.

* * * * *

UNITED STATES PATENT AND TRADEMARK OFFICE
CERTIFICATE OF CORRECTION

PATENT NO.  : 6,642,687 B2
DATED       : November 4, 2003
INVENTOR(S) : Chikara Aoshima It is certified that error appears in the above-identified patent and that said Letters Patent is hereby corrected as shown below:

Title page,
Item [57], ABSTRACT,
Line 12, "and the" should be deleted.

Column 1,
Line 38, "word," should read -- words, --.

Column 3,
Line 56, "illustrates" should read -- illustrate --.
Line 61, "is" should be deleted.

Column 4,
Line 21, "PMW" should read -- PWM --.

Column 5,
Line 54, "45 degree." should read -- 45 degrees. --.
Line 57, "groove 20c" should read -- grooves 20c --.

Column 7,
Line 28, "D11" should read -- D11, --.
Line 64, "aligned" should read -- align --.

Column 8,
Line 35, "sate" should read -- states --.

Column 11,
Line 16, "micro step" should read -- micro-step --.
Line 66, "lens holder 56" should read -- lens holder 55 --.

Column 13,
Line 50, "necessary" should read -- necessarily --.
Line 60, "brought" should read -- and brought --.

Column 14,
Line 21, "it" should read -- said driving circuit --.

UNITED STATES PATENT AND TRADEMARK OFFICE
CERTIFICATE OF CORRECTION

PATENT NO. : 6,642,687 B2
DATED : November 4, 2003
INVENTOR(S) : Chikara Aoshima It is certified that error appears in the above-identified patent and that said Letters Patent is hereby corrected as shown below:

<u>Column 15,</u>
Line 24, "difference" should read -- different --.

<u>Column 16,</u>
Line 42, "arid" should read -- and --.

<u>Column 17,</u>
Line 20, "be" should read -- the --.

<u>Column 18,</u>
Line 18, "we" should read -- the --.
Line 21, "die" should read -- the --.
Line 38, "die" should read -- the --.

Signed and Sealed this

Third Day of February, 2004

JON W. DUDAS
*Acting Director of the United States Patent and Trademark Office*